US009406184B2

(12) United States Patent
Chae et al.

(10) Patent No.: US 9,406,184 B2
(45) Date of Patent: Aug. 2, 2016

(54) SYSTEM AND METHOD FOR ANALYZING AND/OR ESTIMATING STATE OF BANKNOTE PROCESSING APPARATUS

(71) Applicants: Sang Shik Chae, Seoul (KR); Insoo Ko, Seoul (KR); Sang Hwan Jang, Seoul (KR)

(72) Inventors: Sang Shik Chae, Seoul (KR); Insoo Ko, Seoul (KR); Sang Hwan Jang, Seoul (KR)

(73) Assignee: Kisan Electronics Co., Ltd., Seoul (KR)

( * ) Notice: Subject to any disclaimer, the term of this patent is extended or adjusted under 35 U.S.C. 154(b) by 25 days.

(21) Appl. No.: 14/466,980

(22) Filed: Aug. 23, 2014

(65) Prior Publication Data

US 2015/0071522 A1 Mar. 12, 2015

(30) Foreign Application Priority Data

Sep. 6, 2013 (KR) ........................ 10-2013-0107148

(51) Int. Cl.

| | |
|---|---|
| ***G06Q 40/00*** | (2012.01) |
| ***G07D 11/00*** | (2006.01) |
| ***G07F 19/00*** | (2006.01) |
| ***G07D 7/20*** | (2016.01) |
| ***G07D 7/00*** | (2016.01) |

(52) U.S. Cl.

CPC ................ *G07D 7/2058* (2013.01); *G07D 7/00* (2013.01); *G07D 11/0048* (2013.01); *G07D 11/0078* (2013.01)

(58) Field of Classification Search

USPC ................................. 235/375, 376, 379, 381

See application file for complete search history.

(56) References Cited

U.S. PATENT DOCUMENTS

| | | | | |
|---|---|---|---|---|
| 4,931,963 A * | 6/1990 | Kimura | G07C 3/00 | 235/376 |
| 7,232,063 B2 * | 6/2007 | Fandel | G06Q 20/20 | 235/376 |
| 7,454,049 B2 | 11/2008 | Paraskevakos | | |
| 7,522,880 B2 | 4/2009 | Stieber et al. | | |
| 8,152,072 B2 | 4/2012 | Silverbrook et al. | | |
| 8,380,627 B2 | 2/2013 | Fujita | | |
| 8,437,530 B1 | 5/2013 | Mennie et al. | | |
| 8,746,551 B2 * | 6/2014 | Bryant | G06F 1/008 | 235/379 |

(Continued)

FOREIGN PATENT DOCUMENTS

| | | |
|---|---|---|
| JP | 10-63948 A | 3/1998 |
| JP | 2011-113305 A | 6/2011 |

OTHER PUBLICATIONS

Notice of Submission of Opinion for Korean patent application No. 10-2013-0107148 from Korean Intellectual Property Office dated Sep. 22, 2014 with a partial English translation.

Fukuda Ichiro, Ito Yukio and Hayashi Hiroshi; "Banknote Processing Apparatus"; Abstract of JP2011113305 (A); Jun. 9, 2011; Espacenet.

Konta Kazunobu, Abe Tetsuya and Maeda Shigeru; "Fund Investment Supporting Device for Automatic Transaction Device"; Abstract of 10-063948; Jun. 3, 1998; PAJ.

*Primary Examiner* — Tuyen K Vo

(74) *Attorney, Agent, or Firm* — Andrew D. Fortney; Central California IP Group, P.C.

(57) ABSTRACT

There are provided a system and a method for analyzing and/or estimating a state of a banknote processing apparatus. The system includes an information detector configured to detect use information of the banknote processing apparatus in real time, a state estimating apparatus configured to produce statistical information based on the detected use information and produce state estimation information on a state of the banknote processing apparatus and/or an operating environment of the banknote processing apparatus using the statistical information, and a database configured to store one or more of the use information, the statistical information, and the state estimation information.

21 Claims, 4 Drawing Sheets

(56) References Cited

U.S. PATENT DOCUMENTS

2002/0091972 A1* 7/2002 Harris ................... G06F 11/008 714/47.2
2005/0173659 A1* 8/2005 Jespersen ........... G07D 11/0048 250/559.4
2005/0263583 A1* 12/2005 Schlabach .............. G06Q 10/06 235/379
2006/0131381 A1* 6/2006 Timmis .............. G05B 23/0229 235/376
2011/0129139 A1 6/2011 Numata et al.

* cited by examiner

SYSTEM AND METHOD FOR ANALYZING AND/OR ESTIMATING STATE OF BANKNOTE PROCESSING APPARATUS

CROSS-REFERENCE TO RELATED APPLICATION

The present application claims the benefits of the priority of Korean Patent Application No. 10-2013-0107148 filed with the Korean Intellectual Property Office on Sep. 6, 2013. The content of this application is incorporated herein by reference in its entirety.

BACKGROUND OF THE INVENTION

1. Field of the Invention

The present invention relates to a system and a method for analyzing and/or estimating a state of a banknote processing apparatus, and more particularly, to a system and a method for analyzing and/or estimating a state of a banknote processing apparatus, capable of automatically collecting use information such as setting information, state information, counting information, and fitness information of the banknote processing apparatus, and producing state estimation information of the banknote processing apparatus using statistical information produced from or based on the collected use information.

2. Description of the Prior Art

In general, a banknote processing apparatus for automatically counting the number of banknotes is used for preventing staffs of a bank from making mistakes in counting the banknotes. The banknote processing apparatus includes a banknote fitness sorter (or a banknote validator). The banknote fitness sorter (or the banknote validator) is built in the banknote processing apparatus, a vending machine, or an automatic teller machine (ATM) to determine whether fed banknotes are genuine ones. For example, the banknote fitness sorter (or the banknote validator) determines whether the fed banknotes are forged ones, new ones, old ones, or damaged ones. For reference, a banknote processing apparatus as described herein may cover all kinds of banknote processing apparatuses with a banknote validating function as well as a banknote counting function, and banknote validating apparatuses with a banknote counting function.

The banknote processing apparatuses are used in financial institutions such as a bank, a cash transport firm, a currency exchange office and a post office, and business establishments dealing with lots of checks and cashes such as a gas station, a casino, a public restaurant, a hotel, a department store, a super market, a duty-free shop, a large-scale store, a chain store and a convenience store. The banknote processing apparatus has a basically guaranteed durability and/or life (that is, a period in which the banknote processing apparatus may be used as it is). However, the period in which the banknote processing apparatus may be used as it is may vary in accordance with the operating environment or number of uses. Furthermore, constitutional elements like various sensors of the apparatus may go wrong regardless of the durability and/or life of the banknote processing apparatus.

Therefore, it is necessary to periodically examine the banknote processing apparatuses to check states of the banknote processing apparatuses for their trouble prevention. However, since cost, time, and manpower for examining the banknote processing apparatuses may be limited, it is difficult to periodically examine the banknote processing apparatuses. In addition, since the banknote processing apparatuses are exported to and installed in various areas or countries all over the world without being limited to any particular area or a country, it is difficult to periodically examine the banknote processing apparatuses to check the states of the banknote processing apparatuses. In addition, in a conventional art, since set and state information and counting and fitness information of the banknote processing apparatus are in person checked and inquired by a user (or a manager) offline, there have been problems that data may be missed by an arbitrary selection of the user, or various information items may not be analyzed.

A background art of the present invention is disclosed in Korean Patent No. 10-0812254 (registered on Mar. 4, 2008 and entitled "Banknote Validator").

SUMMARY OF THE INVENTION

An aspect of the present invention may provide a system and a method for analyzing and/or estimating a state of a banknote processing apparatus, capable of producing and managing information for accomplishing one or more desired or predetermined purposes, such as automatically collecting various use information items such as setting information, state information, counting information, and/or fitness information of the banknote processing apparatus, analyzing the collected various use information items, and processing the analyzed various use information items to a meaningful pattern to estimate the state of the banknote processing apparatus.

An aspect of the present invention may also provide a system and a method for analyzing and/or estimating a state of a banknote processing apparatus, capable of collecting various use information items of the banknote processing apparatus to produce statistical information and estimating the state of the banknote processing apparatus and a change in the operating environment of the banknote processing apparatus using the statistical information.

An aspect of the present invention may also provide a system and a method for analyzing and/or estimating a state of a banknote processing apparatus, capable of producing state estimation information items of the banknote processing apparatus and processing the produced state estimation information items in a display format known to a manager or a user.

An aspect of the present invention may also provide a system and a method for analyzing and/or estimating a state of a banknote processing apparatus, capable of displaying statistical information produced using various use information items that may be detected by the banknote processing apparatus and various state estimation information items produced using the statistical information as summarized information or detailed information.

According to an aspect of the present invention, a system for analyzing and/or estimating a state of a banknote processing apparatus includes an information detector configured to detect use information of the banknote processing apparatus in real time, a state estimating apparatus configured to produce statistical information (e.g., in accordance with one or more desired or predetermined purposes) based on the detected use information of the banknote processing apparatus and produce state estimation information on a state of the banknote processing apparatus and an operating environment of the banknote processing apparatus using the statistical information, and a database configured to store the use information, the statistical information, and the state estimation information.

According to another aspect of the present invention, a method of analyzing and/or estimating a state of a banknote processing apparatus includes collecting use information of banknote processing apparatuses in real time, classifying the collected use information of the banknote processing apparatuses to produce classified use information, producing statistical information using the classified use information, producing state estimation information on states of the banknote processing apparatuses and operating environments of the banknote processing apparatus based on the produced statistical information, and displaying the state estimation information.

According to the present invention, the various use information items such as the setting information, the state information, the counting information, and/or the fitness information of the banknote processing apparatus may be automatically collected, the state estimation information items by which the state of the banknote processing apparatus may be estimated are displayable based on the collected various use information items, the various use information items of the banknote processing apparatus are collected to produce the statistical information, and/or the state estimation information items, by which the state of the banknote processing apparatus and the change in an operating environment of the banknote processing apparatus may be estimated, are displayed using the statistical information so that it is possible to efficiently manage a plurality of banknote processing apparatuses using limited costs, time, and/or manpower, to use the state estimation information items for making one or more decisions, and/or to cope with a change in the operating environment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
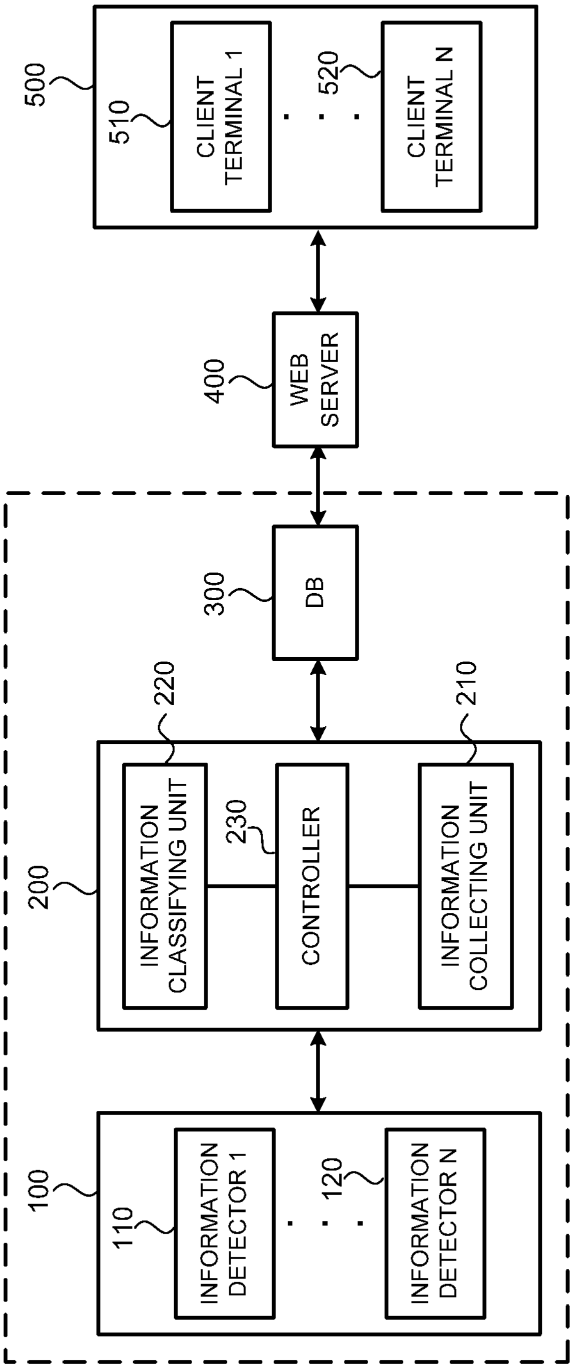
FIG. 1 is a view illustrating a schematic configuration of an exemplary system for analyzing and/or estimating a state of a banknote processing apparatus according to one or more embodiments of the present invention.

Hereinafter, a system and a method for analyzing and/or estimating a state of a banknote processing apparatus according to the present invention will be described with reference to the accompanying drawings. In the drawings, thicknesses of lines and dimensions of elements may be exaggerated for clarity and convenience. In addition, terms described hereinafter are defined in consideration of functions in exemplary embodiments of the present invention and may be changed according to a user/operator's intention or custom. Thus, definitions of terms should be defined on the basis of content throughout the specification.

FIG. 1 is a view illustrating a schematic configuration of a system for analyzing and estimating a state of a banknote processing apparatus according to an exemplary embodiment of the present invention. As illustrated in FIG. 1, the system for analyzing and/or estimating the state of the banknote processing apparatus according to exemplary embodiments of the present invention includes an information detector 100, a state estimating apparatus 200, and a database 300. A web server 400 and a client terminal 500 configured to access the system, analyze and/or estimate the state of the banknote processing apparatus, and/or display state estimation information produced by the system may be further provided.

The information detector 100 may include one or more information detectors 110 to 120 for respectively detecting various use information items from banknote processing apparatuses (not shown) installed in various areas or countries. The information detector 100 detects the use information items while the respective banknote processing apparatuses operate.

For example, the use information items of the respective banknote processing apparatuses may include apparatus information (that is, unique information like a MAC address by which the banknote processing apparatuses are distinguished from each other), area information based on Internet protocol (IP) addresses (for example, a country, an administrative district, a bank branch, etc.), installation information (for example, an apparatus number, a software (SW) version, initial information during shipment, a name and contact information of a person in charge of an apparatus, etc.), nation currency information, download/upload information, state information (for example, normal/failure information, breakdown time, banknote feeding starting/ending time, sensor change information, boot information (e.g., information generated during boot-up of the system, database, etc.), operational information (e.g., information generated during operation), power on/off information, use time, setting information (for example, motor (or rotary) encoder information of each kind of banknote, recognition parameter information, calibration information, a fitness level, etc.), counting and fitness information (for example, a cumulative amount or number of each kind of banknote, etc.), sensor information (for example, setting information and sensing information of a ultrasonic (US) sensor, a ultraviolet (UV) sensor, a magnetic (MG) sensor, a contact image sensor (CIS), combinations thereof, etc., in the bank processing apparatuses), processing result information (for example, a counting result (an amount and/or number of banknotes), a fitness sorting result (for example, new banknotes, banknotes suitable for circulation, banknotes unsuitable for circulation, reason[s] for such unsuitability for circulation such as tape, soil, stain[s], etc.), a recognition result (for example, unrecognized or forged banknotes), a rejection reason, a recognition ratio, image information, etc.), banknote information (for example, serial numbers of banknotes, a kind of banknote, information on forged banknotes, a banknote size, etc.).

The information detector 100 may detect some or all of the information items that may be detected by the respective banknote processing apparatuses other than the above-described use information items. Classification and combination of the information items may be changed when the information items are stored in the database 300 or statistical information therefrom is produced. The information detector 100 is connected to the inside or outside of the respective banknote processing apparatuses to obtain the use information items of the respective banknote processing apparatuses in real time. The information detector 100 periodically transmits the detected use information items of the respective banknote processing apparatuses to the state estimating apparatus 200. In order to periodically transmit the use information items of the respective banknote processing apparatuses, the information detector 100 and the state estimating apparatus 200 may be connected by a wired or wireless network. Therefore, the information detector 100 and the state estimating apparatus 200 may include a communication unit (not shown) for wired and/or wireless network communications.

The state estimating apparatus 200 produces statistical information in accordance with one or more desired or predetermined purposes, based on the collected use information items of the respective banknote processing apparatuses, and determines or estimates states of the respective banknote processing apparatuses using the produced statistical information. In addition, the state estimating apparatus 200 may produce statistical information that may be used for determining or estimating a change in operating environments of the banknote processing apparatuses, such as a forged banknote circulation state, a use amount of each kind of banknote, a banknote circulation or deposit/withdrawal amount for each of one or more different periods of time, one or more different areas and/or bank branches, and/or flows and/or lives of the banknotes (that is, information that may be checked by serial numbers of banknotes) of an area or a country in which the banknote processing apparatuses are used.

The state estimating apparatus 200 may be a server. That is, the state estimating apparatus 200 may be a state estimating server. The state estimating apparatus 200 includes an information collecting unit 210, an information classifying unit 220, and a controller 230.

The information collecting unit 210 collects various use information items of the respective banknote processing apparatuses transmitted by the information detector 100.

For example, the use information items of the respective banknote processing apparatuses may include the apparatus information (that is, unique information like the MAC address that distinguish the banknote processing apparatuses from each other), the area information based on Internet protocol (IP) addresses (for example, the country, the administrative district, the bank branch, etc.), the installation information (for example, the apparatus number, the software (SW) version, the initial information during shipment, the name and contact information of the person in charge of the apparatus, etc.), the nation currency information, the download/upload information, the state information (for example, the normal/failure information, the breakdown time, the banknote feeding starting/ending time, the sensor change information, the boot information, the operational information, the power on/off information, the use time, etc.), the setting information (for example, the motor or rotary encoder information of each kind of banknote, the recognition parameter information, the calibration information, the fitness level, etc.), the counting and/or fitness information (for example, the cumulative amount of each kind of banknote, etc.), the sensor information (for example, the setting information and/or the sensing information of an ultrasonic (US) sensor, ultraviolet (UV) sensor, magnetic (MG) sensor and/or contact image sensor (CIS), etc., in the bank processing apparatuses), the processing result information (for example, the counting result (the amount and/or the number of banknotes), the fitness sorting result (for example, the new banknotes, the banknotes suitable for circulation, the banknotes unsuitable for circulation and reason[s] thereof, etc.), the recognition result (for example, the unrecognized banknotes or the forged banknotes), the rejection reason, the recognition ratio, the image information, etc.), the banknote information (for example, the serial numbers of the banknotes, the kind of banknotes, the information on forged banknotes, the banknote sizes, etc.).

The information classifying unit 220 combines or classifies the information items for producing the statistical information in accordance with the desired or predetermined purpose(s). For example, the use information items collected by the respective banknote processing apparatuses may be variously classified by kind of use information, apparatus, area, country, time, user, banknote type or period, etc., by an input instruction of or from a user.

The controller 230 analyzes the produced statistical information. In order to analyze the statistical information, the controller 230 may process the use information items in a desired or predetermined format so that the use information items can be changed to scores or charts, to digitize, grade, and/or highlight the use information items in color, or to visualize the use information items. For example, the controller 230 may process (or change) current states of the respective banknote processing apparatuses to scores (for example, six out of ten, 60% used, a yellow warning light, etc.) based on the various use information items collected by the respective banknote processing apparatuses (or elements of the respective banknote processing apparatuses). At this time, reference data (for example, durability and/or life data, normal state data of a sensor or a mechanism, etc.) for processing or changing the use information items may also be stored in the database 300.

The use information items are stored in the database 300 in the form of raw data or processed data (for example, data changed to scores or ratios, or processed to colors, digits, grades, charts or visuals in order to produce or display the state estimation information). The database 300 may be directly connected to the inside or outside of the state estimating apparatus 200, or may be connected to the state estimating apparatus 200 by a network.

The database 300 may be controlled by an additional database server (not shown). For example, the use information items of the respective banknote processing apparatuses may be stored in the database 300 through the database server (not shown), or the use information items of the respective banknote processing apparatuses stored in the database 300 may be withdrawn through the database server (not shown). On the other hand, the database server (not shown) may be a server or a cloud-based database (e.g., accessible and/or operated on by cloud-based computing and/or storage).

The controller 230 may modify (or update) or delete the use information items of the respective banknote processing apparatuses stored in the database 300. The controller 230 manages access(es) to the information detector 100 of the respective banknote processing apparatuses, or transmits or receives a signal that controls the information detector 100 or the use information items of the respective banknote processing apparatuses detected by the information detector 100.

The web server 400 displays the use information items of the respective banknote processing apparatuses stored in the database 300, the statistical information produced based on the use information items, and/or the state estimation information produced based on the statistical information on the client terminal 500. The client terminal 500 displays the use information, the statistical information, and the state estimation information of the respective banknote processing apparatuses through a viewer (not shown).

For example, the viewer (not shown) may display the use information items of the respective banknote processing apparatuses collected by the system for analyzing and estimating the state of the banknote processing apparatus according to the present invention, the statistical information produced from the use information items, the state estimation information of the respective banknote processing apparatuses produced using the statistical information, or information by which the operating environments of the respective banknote processing apparatuses is estimated (for example, the banknote circulation state, the forged banknote circulation state, the banknote use amount, the banknote deposit/withdrawal amount, and the flows and/or lives of the banknotes by region, period, banknote type, user and/or bank branch in the area or country of the banknote processing apparatuses) by a predetermined regulation or in various formats (e.g., in accordance with one or more settings of or from a user) so that the user may inquire or report the use information items of the respective banknote processing apparatuses, the statistical information produced from the use information items, the state estimation information of the respective banknote processing apparatuses produced using the statistical information, and/or the information by which the operating environments of the respective banknote processing apparatuses is estimated in a desired or predetermined format. The viewer (not shown) may be a common use viewer, such as an exclusive viewer and/or a web browser.

The state estimation information includes error or failure estimation information that may be produced by comparing the use information with reference data (for example, durability and/or life data, normal state data of a sensor or a mechanism, etc.), and/or banknote use or amount increase estimation information (e.g., the increase in the amount of use of each kind of banknote in an area or a country as trend information, such as an average apparatus use trend by period or region) that may be produced using use periods or use numbers of the banknote processing apparatuses. The user (or manager) may make a decision on an apparatus examination plan, an apparatus supply plan, a plan for securing each kind of banknote, and/or a plan for coping with forged banknotes or banknote advent using the state estimation information.

The use information items and the state estimation information of the respective banknote processing apparatuses displayed on the client terminal 500 may be displayed in the form of the raw data or the processed data. For example, the state estimation information may be displayed in the form of the processed data (for example, colors, scores, ratios, grades, charts, highlights in color, graphs, tables, etc.).

The user (or manager) who checks the state estimation information may inquire detailed information of the raw data for more correct determination. For example, when the user (or manager) selects data of a banknote processing apparatus of which detailed information is desired and/or inquired among the information items displayed through the viewer 510 (refer to FIG. 3) of the client terminal 500, the web server 400 retrieves or withdraws the detailed information (that is, the raw data) of the selected banknote processing apparatus from the database 300 and displays the detailed information through the viewer 510. When the user (or manager) selects information desired and/or inquired in detail from the state estimation information, the web server 400 retrieves or withdraws statistical information and raw data information of the selected state estimation information from the database 300 and displays the statistical information and raw data information.

The client terminal 500 includes one or more client terminals 510 to 520. The client terminal 500 as an authenticated terminal lets an authenticated user access the system for analyzing and/or estimating the state of the banknote processing apparatus. The client terminal 500 may access the system for analyzing and/or estimating the state of the banknote processing apparatus anywhere the user may access the Internet.

As described above, the system for analyzing and/or estimating the state of the banknote processing apparatus according to the present invention may produce the state estimation information based on the statistical information and output the produced state estimation information, determine a current state of an apparatus, estimate generation of failures (or errors), and may grasp, comprehend or warn the user of a possible state of breakdown for the apparatus and/or an error generation ratio.

On the other hand, the system for analyzing and/or estimating the state of the banknote processing apparatus may have the following exemplary hierarchical structure.

Figure 2:
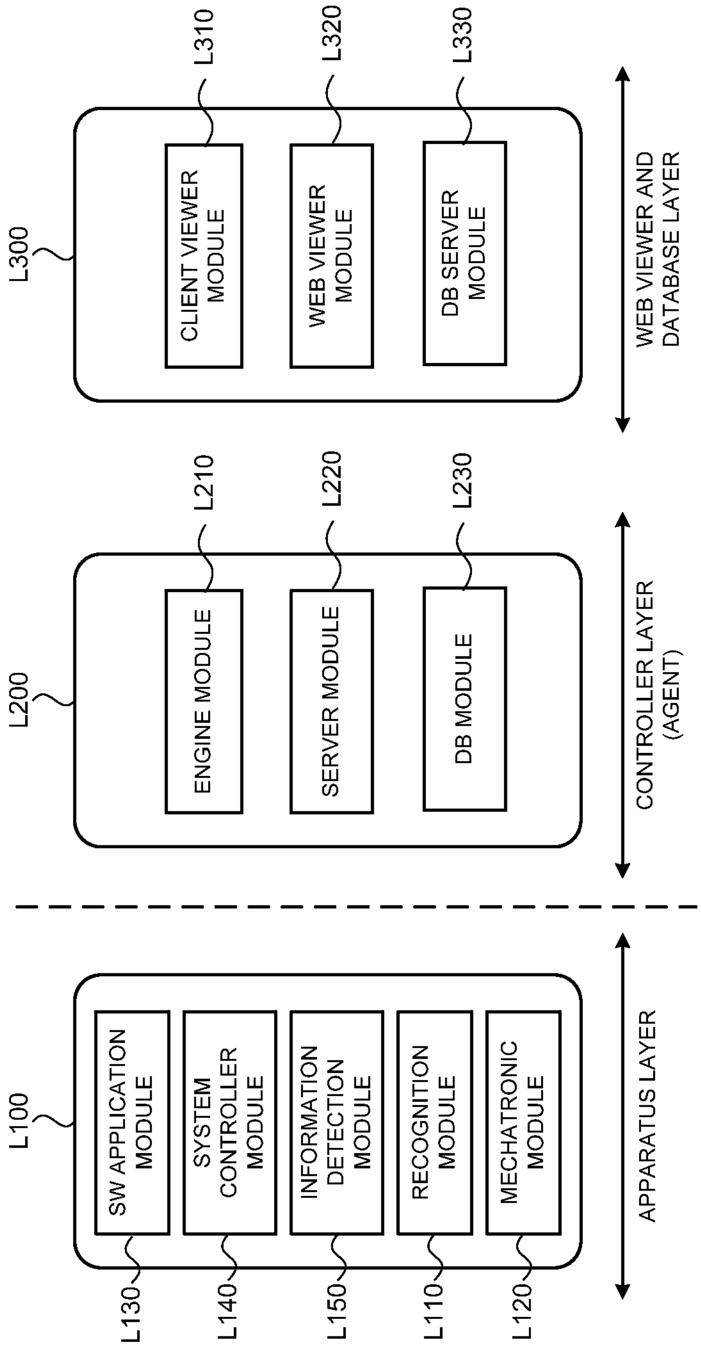
FIG. 2 is a view illustrating a hierarchical structure of an exemplary system for analyzing and/or estimating a state of a banknote processing apparatus according to one or more embodiments of the present invention.

FIG. 2 is a view illustrating a hierarchical structure of a system for analyzing and/or estimating a state of a banknote processing apparatus according to one or more exemplary embodiments of the present invention. As illustrated in FIG. 2, the system for analyzing and/or estimating the state of the banknote processing apparatus according to exemplary embodiment(s) of the present invention may include an apparatus layer L100, a controller layer L200, and a web viewer and database layer L300.

The apparatus layer L100 may be configured to detect use information of a banknote processing apparatus (not shown), obtain the detected use information such as apparatus information, state information, setting information, counting information, and/or fitness information in real time, and transmit the obtained information items to the controller layer L200. The apparatus layer L100 may include a recognition module L110 in the banknote processing apparatus to validate banknotes, a mechatronic module L120 for various mechatronic controls such as transfer of banknotes, a software application module L130 for driving the banknote processing apparatus, a system controller module L140 for controlling electrical or mechatronic elements of the banknote processing apparatus, and an information detection module L150 for detecting the use information of the banknote processing apparatus and transmitting the detected use information to an upper layer (e.g., the controller layer 200).

The controller layer L200 collects the information items transmitted from the apparatus layer L100 and produces statistical information and state estimation information on states of the banknote processing apparatuses and operating environments of the banknote processing apparatuses, such as a forged banknote circulation state, a banknote use amount, flows and/or lives of banknotes, apparatus examination and/or apparatus supply in an area or a country of the banknote processing apparatuses. The controller layer L200 may include an engine module L210 for analyzing the use information items collected by the banknote processing apparatuses and storing the analyzed use information items in a corresponding database, a server module L220 for managing access of the respective banknote processing apparatuses in an arbitrary area or country, producing the statistical information of the collected use information items, producing (e.g., using the statistical information) the state estimation information on the states of the banknote processing apparatuses and the operating environments of the banknote processing apparatuses, and processing the state estimation information to summarize information by which the user (or manager) may easily check the state estimation information, and a database module L230 for inputting, modifying (updating), and deleting the use information received by the engine module L210 or the statistical information or the state estimation information produced by the server module L220. At this time, the database module L230 may include a physical storage space.

The web viewer and database layer L300 stores the use information items of the banknote processing apparatuses stored in the database module L230, the statistical information produced using the use information items, and the state estimation information produced using the statistical information. The use information, the statistical information, and the state estimation information are inquired by or display on the client terminal 500. The web viewer and database layer L300 reports information desired to be inquired by the user (or manager) among the use information, the statistical information, and the state estimation information stored in the database module L230, and includes viewer modules L310 and L320 for displaying an inquired result. The viewer modules L310 and L320 include a predetermined exclusive client viewer module L310 for the system and a common use web viewer module L320 such as a web browser. The viewer modules L310 and L320 are user interfaces that may provide information of various types. The web viewer and database layer L300 includes a database server module L330 having a physical storage space, managing access time between the user and the database module L230, and controlling access of an unauthorized terminal or user.

For reference, the hierarchical structure of the system for analyzing and/or estimating the state of the banknote processing apparatus is only exemplary, and the hierarchical structure may be divided in more detail or more simply configured. In addition, the elements illustrated in the hierarchical structure may be differently denoted, although they perform the same function. In addition, one element (or layer) may perform (alone or collectively with another component) a function of another element (or layer).

Figure 3:
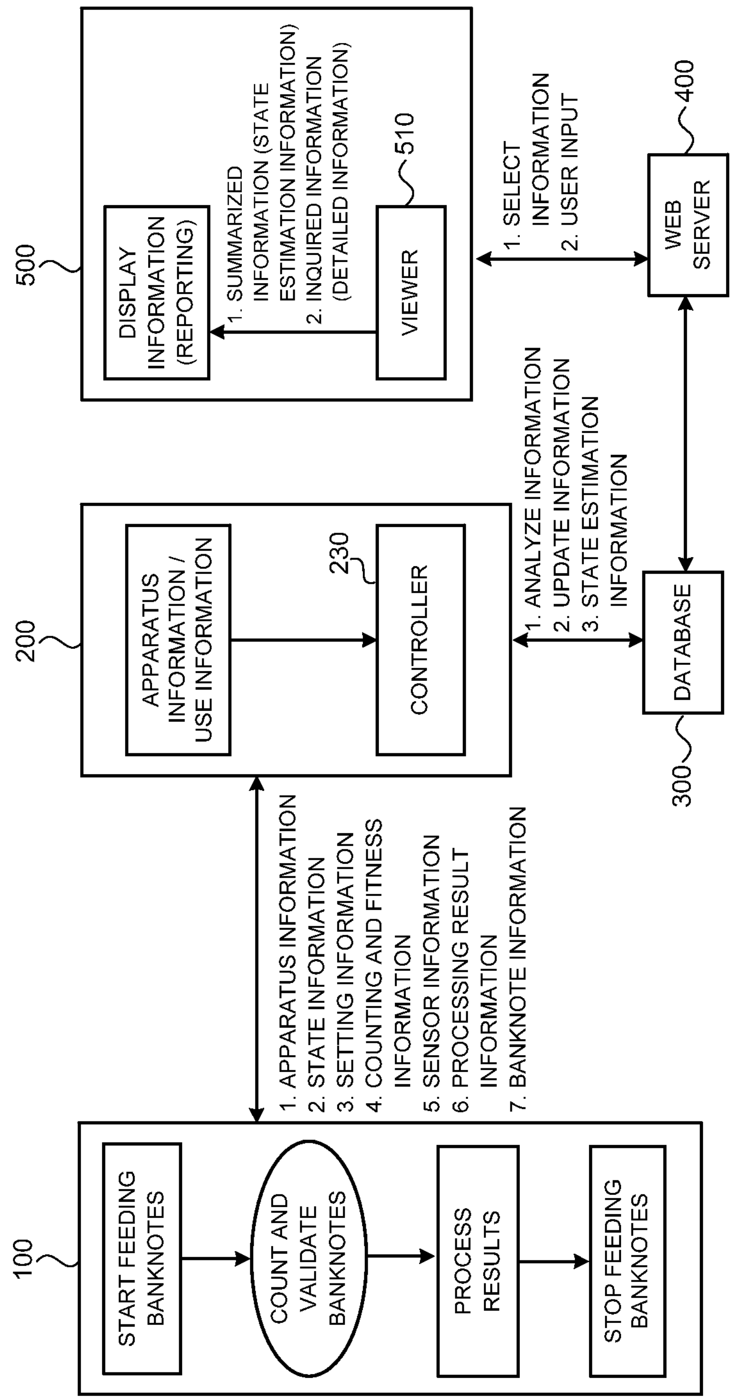
FIG. 3 is a view illustrating flow of data of an exemplary system for analyzing and/or estimating a state of a banknote processing apparatus according to one or more embodiments of the present invention.

FIG. 3 is a view illustrating an exemplary flow of data in a system for analyzing and/or estimating the state of a banknote processing apparatus according to one or more embodiments of the present invention. As illustrated in FIG. 3, the information detector 100 detects various use information items generated while booting up banknote processing apparatuses and/or feeding and counting banknotes, and transmits the detected use information items to the state estimating apparatus 200.

For example, the use information items of the respective banknote processing apparatuses include the apparatus information (that is, unique information like the MAC address by which the banknote processing apparatuses are distinguished from each other), area information based on the Internet protocol (IP) addresses (for example, the country, the administrative district, the bank branch, etc.), installation information (for example, the apparatus number, the software (SW) version, the initial information during shipment, the name and contact information of the person in charge of the apparatus, etc.), the nation currency information, the download/upload information, the state information (for example, the normal/failure information, the breakdown time, the banknote feeding starting/ending time, the sensor change information, boot information, operational information, the power on/off information, the use time, etc.), the setting information (for example, the motor or rotary encoder information of each kind of banknote, recognition parameter information, calibration information, the fitness level, etc.), the counting and fitness information (for example, the cumulative amount of each kind of banknote, etc.), sensor information (for example, the setting information and the sensing information of an ultrasonic (US) sensor, ultraviolet (UV) sensor, magnetic (MG) sensor and/or contact image sensor (CIS), etc. in the bank processing apparatuses), processing result information (for example, the counting result, the fitness sorting result, the recognition result, the rejection reason, the recognition ratio, the image information, etc.), the banknote information (for example, the serial numbers of the banknotes, the kind[s] of banknotes, information on forged banknotes, the banknote sizes, etc.).

The state estimating apparatus 200 classifies the use information items of the banknote processing apparatuses to produce statistical information to be used for producing the state estimation information. The state estimating apparatus 200 may classify and/or analyze the statistical information by kind of information, kind of banknote, apparatus, area, country, bank branch, time, and/or period to produce the state estimation information.

The use information, the statistical information, and the state estimation information of the banknote processing apparatuses are updated to the database 300 in real time. The state estimating apparatus 200 may compare previously stored reference data (for example, durability and/or life data, normal state data of a sensor or a mechanism, etc.) with the statistical information to produce the state estimation information.

Using the state estimation information, not only error or failure estimation information of the banknote processing apparatuses, but also information estimating an increase in the use and/or amount of each kind of banknote in an area or a country may be produced based on statistical information items such as a forged banknote circulation amount, a forged banknote advent ratio, a forged banknote recognition ratio, and/or an apparatus driving ratio. Therefore, the user (or manager) may make a decision on an apparatus examination plan, an apparatus supply plan, a plan for securing each kind of banknote, and/or a plan for coping with forged banknotes or a change in the operating environment (e.g., by period) using the state estimation information.

The state estimation information may be provided in the form of simple summarized information through the client terminal 500. Selection (e.g., a request for detailed information) by the user may be received or made from or among the provided summarized information, and more detailed information may be provided. For example, the summarized information may be displayed in the form of processed data (for example, colors, scores, ratios, grades, charts, graphs, tables, etc.).

The web server 400 retrieves or withdraws the summarized information displayed on the client terminal 500 and the detailed information requested and/or inquired by the user from the database 300. The retrieved or withdrawn information items (for example, the summarized information and the detailed information) are output in a format suitable for the viewer 510 and are displayed.

Figure 4:
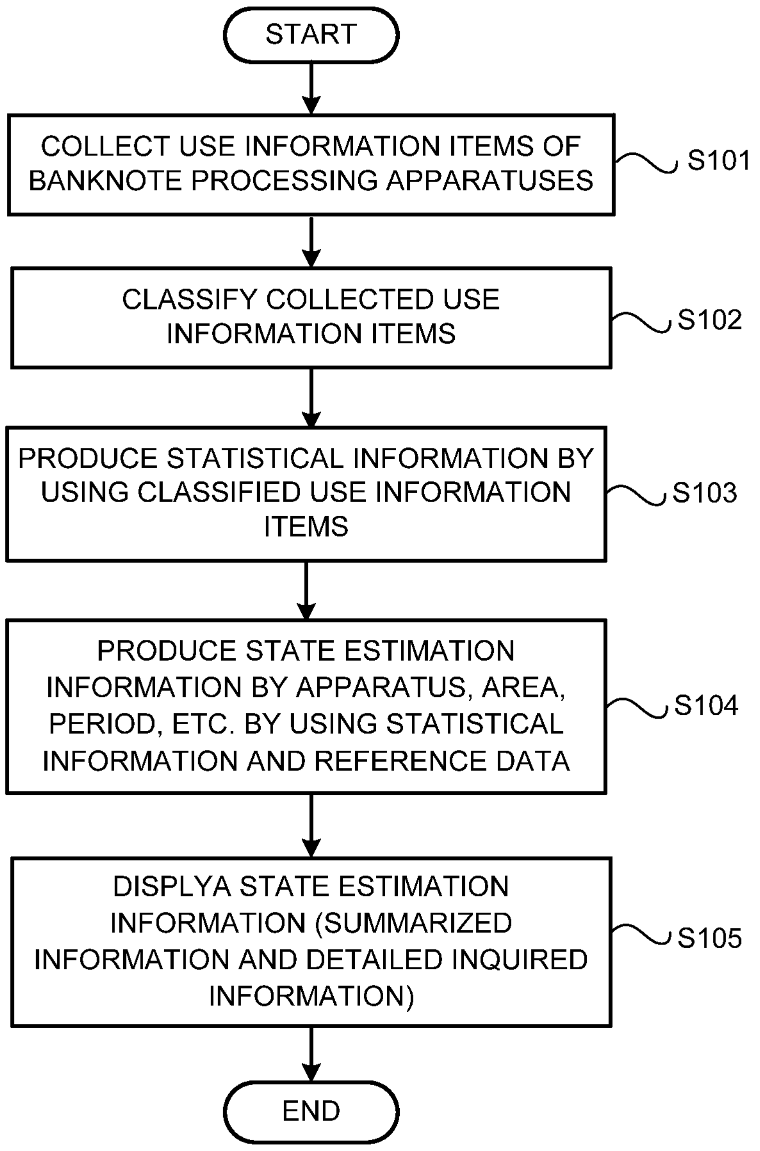
FIG. 4 is a flowchart illustrating an exemplary method of estimating a state of a banknote processing apparatus according to one or more embodiments of the present invention.

FIG. 4 is a flowchart illustrating an exemplary method of analyzing and/or estimating a state of a banknote processing apparatus according to one or more embodiments of the present invention.

As illustrated in FIG. 4, the state estimating apparatus 200 collects use information items of banknote processing apparatuses (not shown) in various areas or countries in real time S101. For example, the use information items of the banknote processing apparatuses include apparatus information (as described herein, which may include area information based on the Internet protocol (IP) addresses, installation information, initial information during shipment, the name and contact information of the person in charge of the apparatus, etc.), the nation currency information, the download/upload information, the state information (for example, normal/failure information, breakdown time, banknote feeding starting/ending time, sensor change information, boot information, operational information, power on/off information, use time, etc.), the setting information, the counting and fitness information, the sensor information, the processing result information, the fitness sorting result, the recognition result, the rejection reason, the recognition ratio, the image information, the banknote information, etc.

The state estimating apparatus 200 classifies the collected use information items of the banknote processing apparatuses to produce the state estimation information (S102). For example, the state estimating apparatus 200 classifies the collected use information items of the banknote processing apparatuses by kind of information, apparatus, area, country, time, or period. The use information items may be classified or combined by different methods in accordance with the state estimation information.

In addition, the state estimating apparatus 200 produces statistical information using the classified use information items (S103). The use information and the statistical information are updated to the database 300 in real time by kind of information, apparatus, area, country, time, or period, in accordance with classified or combined information.

The state estimating apparatus 200 produces state estimation information using previously stored reference data (for example, durability and/or life data, normal state data of a sensor or a mechanism, etc.) and the statistical information (S104). The state estimation information may include not only error or failure estimation information of the banknote processing apparatuses, but also banknote use and/or amount increase estimation information in an area or a country, which is produced based on various statistical information items such as an apparatus operating time, a non-operating ratio, a processing ratio of each (relevant) national currency, a forged banknote circulation amount, a forged banknote advent ratio, a forged banknote recognition ratio, and/or an apparatus driving ratio. The state estimation information may further include failure estimation information by apparatus and use trend information (such as an average apparatus use trend by period) that may be produced using use periods or use numbers of the banknote processing apparatuses.

The state estimating apparatus 200 displays the produced state estimation information on the client terminal 500 (S105). The state estimation information may include simple summarized information or detailed information requested or inquired by the user. The summarized information may be processed to generate data of various types (for example, colors, scores, ratios, grades, charts, graphs, tables, etc.) that may be displayed.

Therefore, the user may make a decision on an apparatus examination plan, an apparatus supply plan, a plan for securing each kind of banknotes, and/or a plan for coping with forged banknotes using the state estimation information, and may remotely repair failures (for example, program download, set value management, etc.) to reduce costs.

The foregoing embodiments and advantages are merely exemplary and are not to be considered as limiting the present invention. It will be apparent to those skilled in the art that modifications and variations can be made without departing from the spirit and scope of the invention. This description is intended to be illustrative, and not to limit the scope of the claims. Also, although an embodiment has not been described in the above invention, it should be extensively construed within the scope of the technical concept defined in the claims. And, various changes and modifications that fall within the scope of the claims, or equivalents of such scope are therefore intended to be embraced by the appended claims.

What is claimed is:

1. A system for analyzing and estimating a state of a banknote processing apparatus, the system comprising:

an information detector configured to detect a plurality of different use information items of the banknote processing apparatus as raw data in real time during operation of the banknote processing apparatus;

a state estimating apparatus connected to the information detector by a wired or wireless network and configured to produce (i) statistical information based on the detected use information items of the banknote processing apparatus and (ii) state estimation information on a state of the banknote processing apparatus and an operating environment of the banknote processing apparatus using the statistical information; and a database connected to the state estimating apparatus and configured to store one or more of the use information items of the banknote processing apparatus, the statistical information, and the state estimation information, wherein when the database stores the use information items, the use information items are stored as the raw data or as processed data, wherein the system is configured to allow access to the database and display the use information items, the statistical information and the state estimation information of the banknote processing apparatus on an authenticated client terminal, and the authenticated client terminal inquires, displays or reports the use information items, the statistical information and the state estimation information in a format set by a user.

2. The system of claim 1, wherein the state estimating apparatus comprises:

an information collecting unit configured to collect the use information items from the information detector;

an information classifying unit configured to combine or classify the collected use information items into classified information items for producing the statistical information and the state estimation information; and a controller configured to produce the state estimation information using the statistical information.

3. The system of claim 2, wherein the controller processes the classified information items to a desired or predetermined format and produces the statistical information and the state estimation information, and the controller analyzes the statistical information by comparing the statistical information with reference data including durability and life data of the banknote processing apparatus, or normal state data of a sensor or a mechanism in the banknote processing apparatus.

4. The system of claim 2, wherein the information classifying unit classifies the collected use information items by kind of use, apparatus, area, country, time, user, banknote type or period.

5. The system of claim 2, wherein the controller processes the use information items in a desired or predetermined format to change the use information items to scores or charts, to digitize, grade, or highlight the use information items in color, or to visualize the use information items.

6. The system of claim 2, wherein the controller is configured to update, correct or delete the use information items in the database.

7. The system of claim 2, wherein the controller manages access to the information detector, or transmits or receives a signal configured to control the information detector or the use information items detected by the information detector.

8. The system of claim 1, wherein the state estimating apparatus produces the state estimation information by comparing the statistical information with reference data, and the reference data comprises durability and life data of the banknote processing apparatus, or normal state data of a sensor or a mechanism in the banknote processing apparatus.

9. The system of claim 1, wherein the database is accessible through a web server, and the use information items, the statistical information, and the state estimation information of the banknote processing apparatus are stored in the database.

10. The system of claim 1, wherein the use information items comprise at least two members of the group consisting of (i) apparatus information including unique information of the apparatus, area information, installation information, nation currency information, or download/upload information, (ii) state information including normal/failure information, breakdown time information, banknote feeding starting/ending time information, sensor change information, boot information, operational information, power on/off information, or time of usage information, (iii) setting information including motor encoder information, recognition parameter information, calibration information, or fitness level information, (iv) counting and fitness information including banknote count and cumulative amount information, sensor setting information, or sensor sensing information, (v) processing result information including a counting result, a fitness sorting result, a recognition result, a rejection reason, a recognition ratio, or banknote image information, and (vi) banknote information including a banknote serial number, a banknote kind, a banknote size, or forged banknote information.

11. The system of claim 1, wherein the state estimation information comprises one or more of:

error or failure estimation information of the banknote processing apparatus, wherein the state estimating apparatus produces the error or failure estimation information by comparing the use information items with reference data;

average apparatus use trend information by period, wherein the state estimating apparatus produces the average apparatus use trend information using use periods or use numbers of the banknote processing apparatus;

banknote use or amount increase estimation information, wherein the banknote use or amount in the banknote use or amount increase estimation information is in an area or a country in which the banknote processing apparatus is located; and environment information, including a forged banknote circulation state, a banknote use amount, a banknote circulation amount, a deposit/withdrawal amount of periods, areas or bank branches, or flows and lives of the banknotes of the area or the country in which the banknote processing apparatus is used.

12. The system of claim 1, wherein the state estimation information comprises summarized information or detailed information requested by the user, and at least one of a color, score, ratio, grade, chart, graph, and table of the summarized information is displayable.

13. The system of claim 1, wherein the state estimating apparatus uses the state estimation information to make one or more decisions on an apparatus examination plan, an apparatus supply plan, a plan for securing one or more kinds of banknotes, and a plan for coping with forged banknotes.

14. The system of claim 1, wherein the database comprises a server or a cloud-based database.

15. A method of analyzing and estimating a state of a banknote processing apparatus, the method comprising:

collecting a plurality of different use information items of the banknote processing apparatus as raw data in real time during operation of the banknote processing apparatus;

classifying the collected use information items of the banknote processing apparatus to produce classified use information;

producing statistical information using the classified use information;

producing state estimation information on states of the banknote processing apparatus and operating environments of the banknote processing apparatus based on the statistical information;

storing one or more of the use information items, the statistical information, and the state estimation information in a database, the use information items being stored as the raw data or as processed data; and displaying the use information items, the statistical information, and the state estimation information of the banknote processing apparatus on an authenticated client terminal, wherein the authenticated client terminal inquires, displays or reports the use information items, the statistical information and the state estimation information in a format set by a user.

16. The method of claim 15, wherein the state estimation information is produced by comparing the statistical information with reference data, and the reference data comprises durability and life data of the banknote processing apparatus, or normal state data of a sensor or a mechanism included in the banknote processing apparatus.

17. The method of claim 15, wherein the state estimation information comprises summarized information or detailed information requested by the user, and at least one of a color, score, ratio, grade, chart, graph, and table of the summarized information is displayable.

18. The method of claim 15, further comprising making one or more decisions on an apparatus examination plan, an apparatus supply plan, a plan for securing one or more banknotes, and a plan for coping with forged banknotes using the state estimation information.

19. The method of claim 15, wherein the state estimation information comprises one or more of:

error or failure estimation information of the banknote processing apparatus, wherein the state estimating apparatus produces the error or failure estimation information by comparing the use information items with reference data;

average apparatus use trend information by period, wherein the state estimating apparatus produces the average apparatus use trend information using use periods or use numbers of the banknote processing apparatus;

banknote use or amount increase estimation information, wherein the banknote use or amount of in the banknote use or amount increase estimation information is in an area or a country in which the banknote processing apparatus is located; and operating environment information, including one or more of a forged banknote circulation state, a banknote use amount, a banknote circulation amount, a deposit/withdraw amount of periods, areas or bank branches, or flows and lives of the banknotes of the area or the country in which the banknote processing apparatus is used.

20. The method of claim 15, wherein the use information items comprise at least two members of the group consisting of (i) apparatus information including unique information of the apparatus, area information, installation information, nation currency information, or download/upload information, (ii) state information including normal/failure information, breakdown time information, banknote feeding starting/ending time information, sensor change information, boot information, operational information, power on/off information, or use time information, (iii) setting information including motor encoder information, recognition parameter information, calibration information, or fitness level information, (iv) counting and fitness information including count and cumulative amount information, sensor setting information or sensor sensing information, (v) processing result information including a counting result, a fitness sorting result, a recognition result, a rejection reason, a recognition ratio, or banknote image information, and (vi) banknote information including a banknote serial number, a banknote kind, a banknote size, or forged banknote information.

21. The method of claim 15, wherein the use information items, the statistical information, and the state estimation information of the banknote processing apparatus are stored in the database.

* * * * *